S. WALKER.
Stove Cover Lifter.
No. 45,541. Patented Dec. 20, 1864.
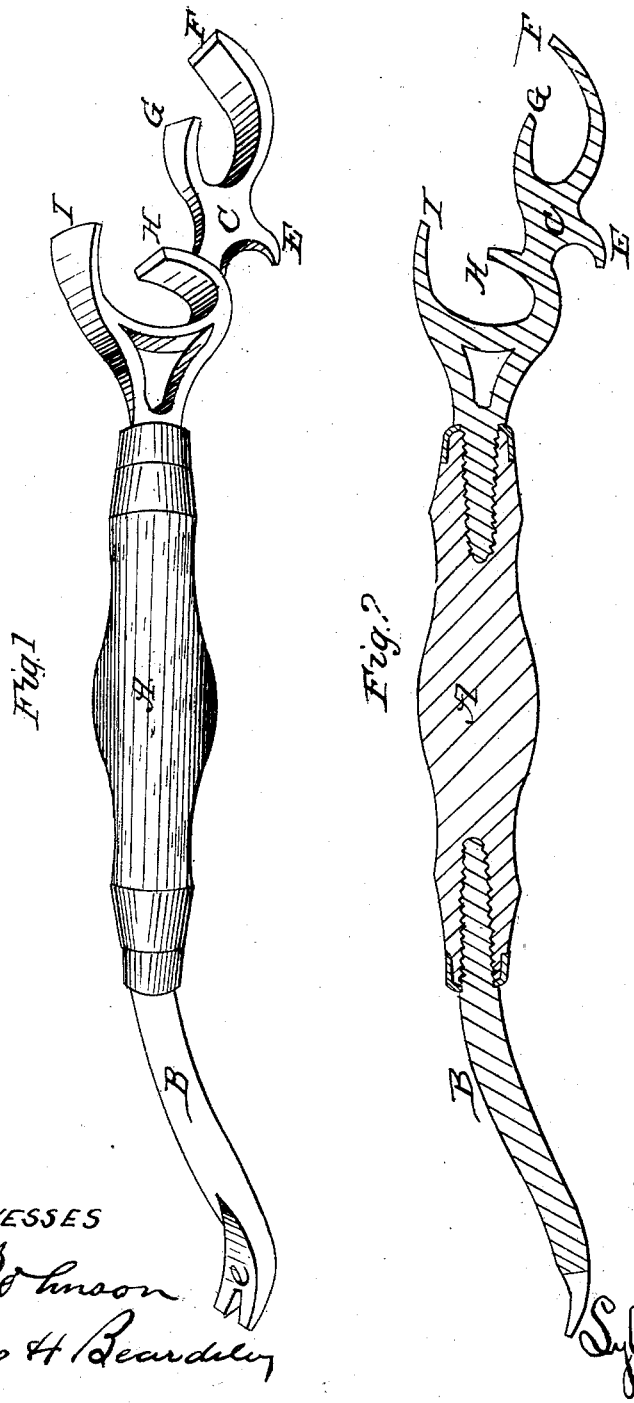
WITNESSES
R. Johnson
James H Beardsley
INVENTOR
Sylvenus Walker

UNITED STATES PATENT OFFICE.

SYLVENUS WALKER, OF TREMONT, NEW YORK, ASSIGNOR TO HOWARD TILDEN, OF PHILADELPHIA, PENNSYLVANIA.

STOVE-COVER LIFTER.

Specification forming part of Letters Patent No. 45,541, dated December 20, 1864.

*To all whom it may concern:*

Be it known that I, SYLVENUS WALKER, of Tremont, in the county of Westchester and State of New York, have invented a new and useful Improvement in Stove-Cover Lifters; and I do hereby declare that the following is a full and exact description thereof, reference being had to the accompanying drawings, and to the letters of reference marked thereon, making part of this specification, in which—

Figure 1 represents my invention in a perspective view. Fig. 2 is a vertical central section showing the screws upon the ends of the parts B and C for connecting the same to the handle A.

Similar letters of reference indicate corresponding parts.

This invention relates to certain improvements upon a stove-cover lifter patented November 26, 1861, by R. W. Huston, of Providence, Rhode Island.

The object of this invention is to obtain a simple, unique, and economical device that will serve as a stove-cover lifter, also for lifting heated plates, dishes, &c.; and it consists in a novel and improved combination of the several parts of the device whereby a simple and economical arrangement of the several parts is obtained.

The invention also consists in an improved handle non-ducting of heat.

To enable those skilled in the art to fully understand and construct my invention, I will proceed to describe it.

A represents the handle, which is of wood. B is a cast-metal bar, with a screw-thread at one end to secure it firmly in the handle A. The other end has a notch, $e$, formed in the upper side, sloping downward, and terminating at the lower side, forming a V-shaped cavity or claws for pulling tacks. The ends of the claws serve also for lifting stove-covers. At the other end of the handle is the metal piece C, with a screw-thread, the same as on the bar B, the other end of which is provided with the claws F G H I and hook E. The claws F and G are for lifting heated plates. H and I are for lifting dishes by clasping the edge of the same. The hook E serves for lifting pots and kettles by their bails.

The handle A, being of wood, is not liable to become heated when the lifter B is left in the stove-cover, as is usually the most convenient to keep it, while the screws serve to fasten them secure in the handle. In case of shrinkage, they are easily tightened, to prevent their pulling out in consequence of the articles suspended by them.

Having thus described my invention, what I claim as new, and desire to secure by Letters Patent, is—

As a new article of manufacture, a stove-cover lifter, tack-drawer, plate and dish lifter, pot and kettle lifter combined, consisting of handle A, lifter B, tack-drawer $e$, lifter C, with claws F G H I, and hook E, when combined and arranged as described, for the purpose set forth.

SYLVENUS WALKER.

Witnesses:
 JOHN F. GRAY,
 JAMES H. BEARDSLEY.